United States Patent
Lebrun et al.

(10) Patent No.: US 6,723,996 B2
(45) Date of Patent: Apr. 20, 2004

(54) VARIABLE COLLIMATION RADIATION DETECTOR

(75) Inventors: Alain Lebrun, Vienna (AT); Marc Merelli, Gif-sur-Yvette (FR)

(73) Assignees: Commissariat a l'Energie Atomique, Paris (FR); Compagnie Generale des Matieres, Velizy Villacoublay Cedex (FR)

( * ) Notice: Subject to any disclaimer, the term of this patent is extended or adjusted under 35 U.S.C. 154(b) by 105 days.

(21) Appl. No.: 09/890,638

(22) PCT Filed: Dec. 7, 2000

(86) PCT No.: PCT/FR00/03428
§ 371 (c)(1),
(2), (4) Date: Aug. 3, 2001

(87) PCT Pub. No.: WO01/42814
PCT Pub. Date: Jun. 14, 2001

(65) Prior Publication Data
US 2002/0125429 A1 Sep. 12, 2002

(30) Foreign Application Priority Data
Dec. 8, 1999 (FR) .................................... 99 15469

(51) Int. Cl.⁷ ................................................ G01T 1/16
(52) U.S. Cl. ..................................... 250/393; 250/505.1
(58) Field of Search ................................ 250/393, 505.1

(56) References Cited

U.S. PATENT DOCUMENTS 6,353,227 B1 * 3/2002 Boxen ...................... 250/363.1
6,518,579 B1 * 2/2003 Xu et al. ..................... 250/393

FOREIGN PATENT DOCUMENTS

| FR | 2629249 A1 | 9/1989 | |
| FR | 2706629 A1 | 12/1994 | |
| GB | 2265002 A | 9/1993 | |
| JP | 62080579 A | * 4/1987 | ........... G01T/1/169 |
| JP | 02242191 A | 9/1990 | |

* cited by examiner

Primary Examiner—Constantine Hannaher
(74) Attorney, Agent, or Firm—Thelen Reid & Priest, LLP

(57) ABSTRACT

Servocontrol is achieved on a radiation detector that controls a motor (7) that makes a rod (9) slide, tilting a mobile portion (12) of an absorbing enclosure (2) to open or close a collimation slit (3) and adjust the amount of radiation received by the detection solid (1) to an ideal value for measurement precision.

This device can be used particularly in gamma spectrometry.

3 Claims, 3 Drawing Sheets

VARIABLE COLLIMATION RADIATION DETECTOR

This application is a national phase of PCT/FR00/03428, and International Application No. 99/15469, which was filed on Dec. 8, 1999, and was not published in English.

DESCRIPTION

The objective in this case is a radiation detector with variable collimation.

Some radiation detectors such as gamma spectrometer detectors have a limited usage range in terms of the count rate, particularly when used at ambient temperature. Above a certain count rate, their resolution capacity reduces and the gain varies, which causes the formation of deformed and shifted absorption peaks. Conversely, a low count rate makes it possible to maintain the characteristics of the detector but causes unacceptable measurement durations for a given precision. Therefore, there is only a small activity range that can be measured under acceptable conditions.

The purpose of variable collimation is to widen the measurement range of this type of detector by optimizing the count rate. Collimation devices that can be used to adjust the count rate of some detectors do exist. However, these devices are usually heavy and associated with large detectors and are not suitable for automatic servocontrol. Note French patent 2 629 249 that comprises a drum supporting the counter at its center and a group of collimators with variable width slits; rotation of the barrel drives the collimators in front of the counter in order to give the required degree of absorption.

Obviously, the group of collimators surrounding the detector is particularly cumbersome.

It should be considered that the gamma spectrometry detectors used at ambient temperature for which this collimation adjustment would be particularly appreciated, are usually small, portable and their front face where the collimation slit is formed is usually immersed in water. It is then difficult to access the collimator and it cannot be replaced or moved during the measurement. Therefore it is not even possible to adjust collimation of this type of detector during the measurement using a barrel device extending in front of and behind the counter.

The invention consists of a combination of several means providing a solution to these various requirements and capable of servocontrolling collimation of the detector at any time as a function of the count rate that it receives. More precisely, the detector comprises a counter that measures ambient radioactivity, an absorbing enclosure surrounding the counter except at a collimation slit leading towards the counter, the absorbing enclosure comprises a mobile portion partially delimiting the collimation slit, and the detector comprises a motor servocontrolled to a counter signal set intensity, and a transmission between the motor and the mobile part of the absorbing enclosure to move the enclosure so as to increase or reduce the width of the collimation slit depending on the motor activity, the motor extending on one side of the detector opposite the collimation slit and the transmission extending through the absorbent enclosure.

One particularly simple construction comprises an axis parallel to a length direction of the slit to which the mobile portion is articulated, the transmission is a sliding rod on the top of which there is a handle free to slide in a drilling, oblique with respect to the rod, formed in the mobile portion.

Another advantage is that the mobile portion delimits the collimation slit by a convex face moving away from the axis.

The invention will now be described by means of the following figures.

Figure 1:
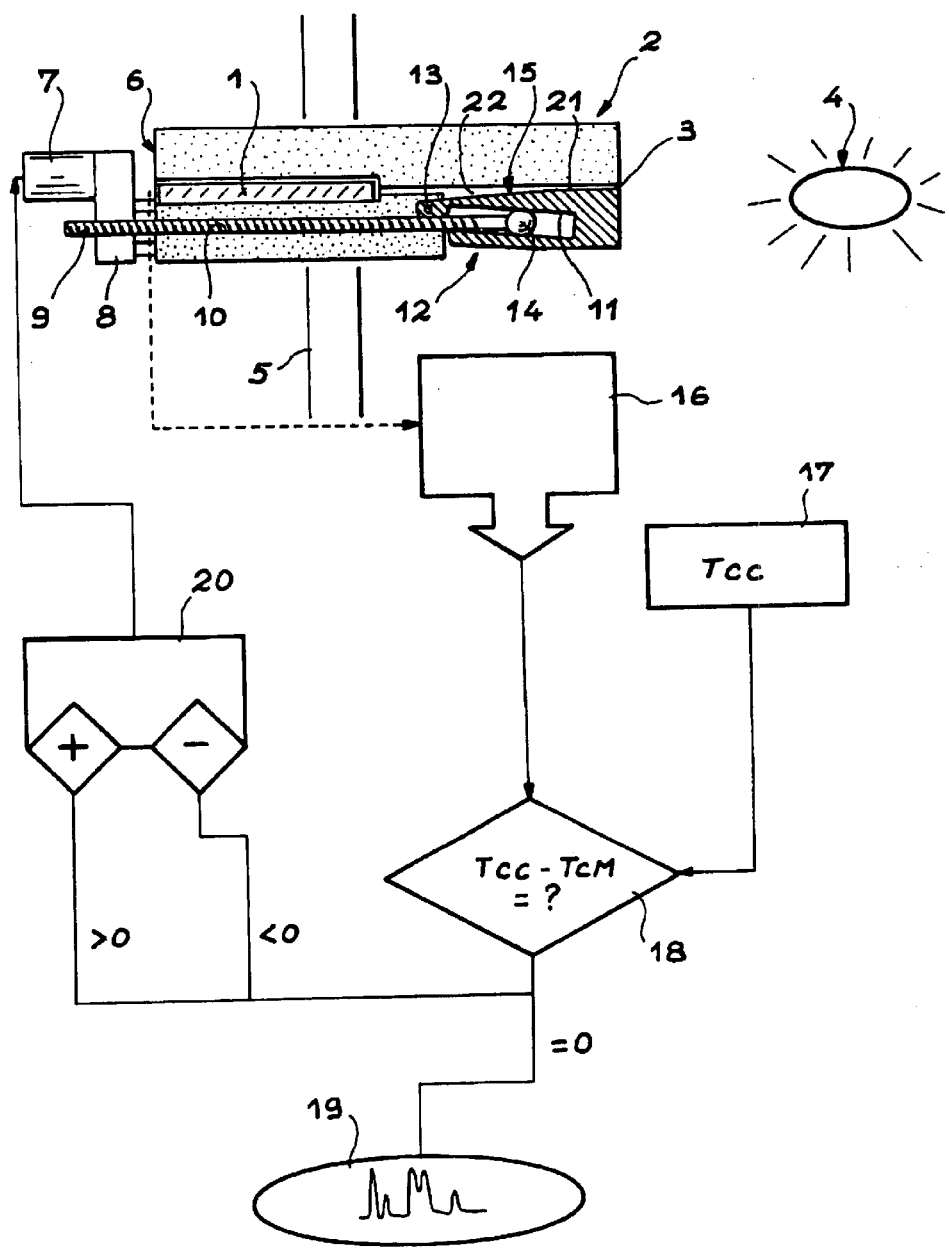
FIG. 1 represents a general diagram of the invention.
Figure 2:
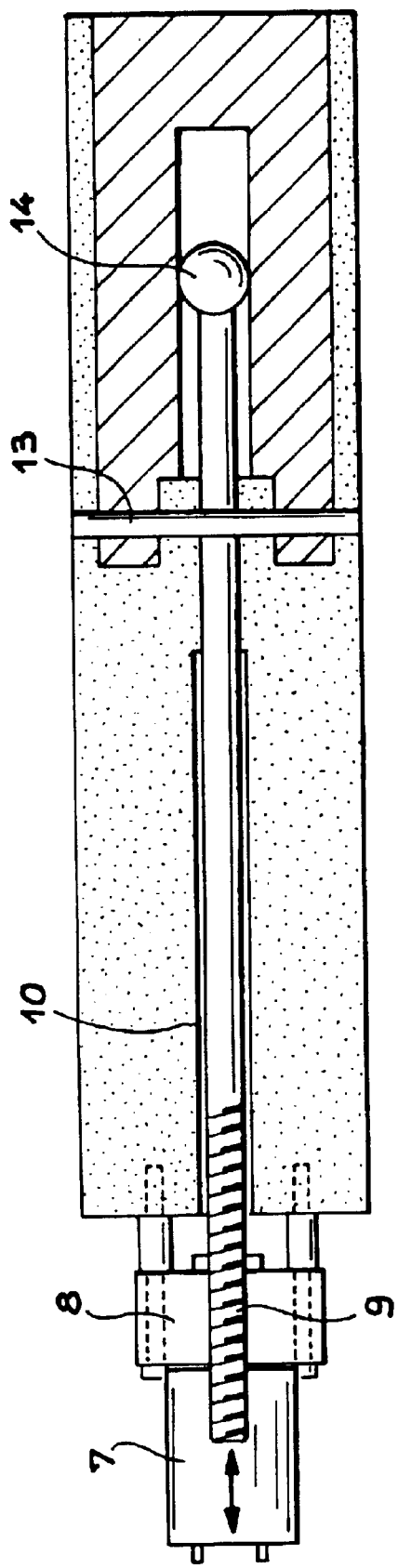
FIGS. 2 and 3 are two other views illustrating the detector.
Figure 3:
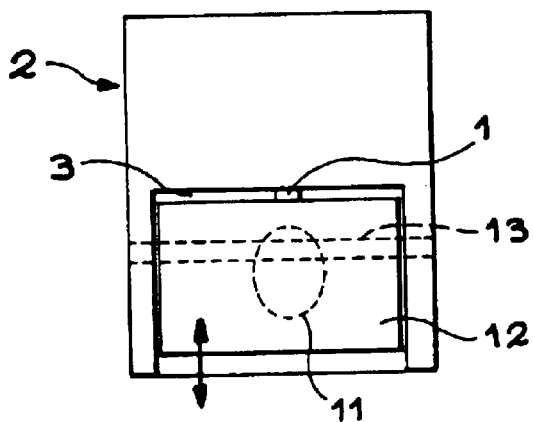

The detector comprises a radioactivity counter 1 placed in an absorbent enclosure 2 provided with a collimation slit 3 through which the counter 1 "sees" a source 4 emitting a gamma radiation. The protective wall 5 isolates the source 4 from the outside and usually encloses a radiation absorption liquid. The detector usually penetrates through the protection wall 5, and its part located on the side of the source 4 is usually immersed. The housing of the counter 1 opens up on the back side 6 of the absorbing enclosure 2 so that it can easily be replaced.

The back face 6 supports a motor 7 that drives a transmission 8, the end of the transmission driving a threaded rod 9 passing through a drilling 10 in the absorbing enclosure 2 and on the other side passing through a drilling 11 in a mobile part 12 of the absorbing enclosure 2; this mobile part 12 pivots about an axis 13, the ends of which are fixed to the complementary part of the absorbing enclosure 2 and which extends along the direction of the length of the collimation slit.

The drilling 11 is oblique to the rod 9, and the rod 9 finishes at a handle 14 that slides with slight clearance in this drilling 11. Therefore the sliding movement of the rod 9 that makes the handle 14 penetrate more or less into the drilling 11, tilts the mobile part 12 around the axis 13; and since this mobile part 12 partially delimits the collimation slit 3 by its convex face 15 forming one of its lips, its movement modifies the width of the collimation slit 3 and therefore the area of the section open to radiation from source 4 to the counter 1.

The counter 1 is connected to a spectrometer 16 to which it outputs its signal. The spectrometer 16 evaluates the count rate Tcm from sensor 1, in other words the total gamma activity that it receives and estimates the energy in the different bands to give the positions of energy peaks. A servocontrol loop comprises logical means connected to the spectrometer 16 and the motor 7 and that include a memory 17 that contains a set count rate Tcc, a comparator 18 that compares the set count rate Tcc with the count rate Tcm measured by the spectrometer 16, while transmitting the signal processed by the spectrometer 16 to a terminal 19 that displays or prints the results of the spectrometric measurement; but if the set count rate Tcc is not equal to the measured count rate Tcm, the comparator 18 supplies the difference to a control installation 20 for motor 7 to control the motor in one of the two directions depending on whether the signal is greater than or less than the set count rate, in which case the collimation slit 3 should be closed or opened respectively.

Thus, the total count Tcm in the total signal transmitted by the detector 1 is used to control the collimator, whereas the spectrometric information is defined in the measurement given by the terminal 19.

Figure 4:
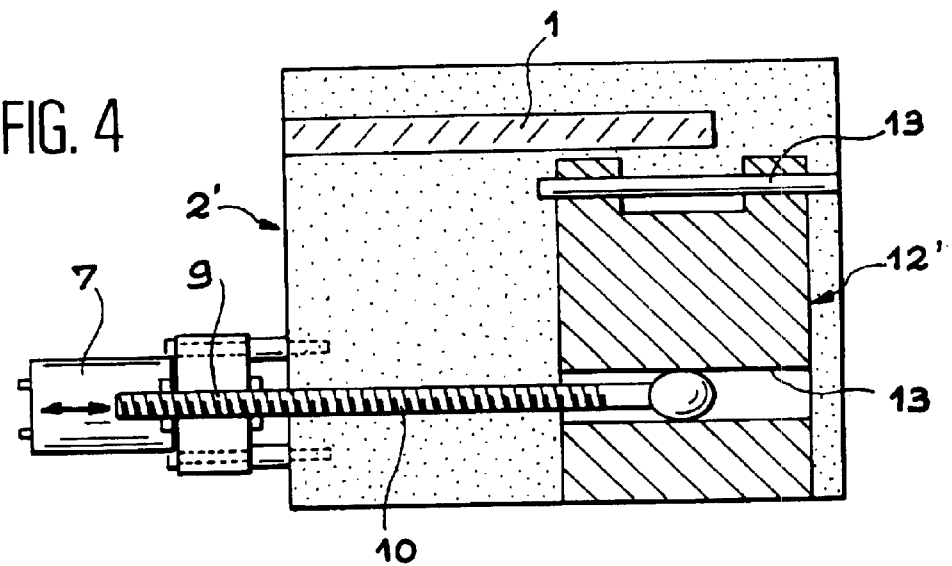
FIGS. 4 and 5 illustrate another embodiment of the detector.
Figure 5:
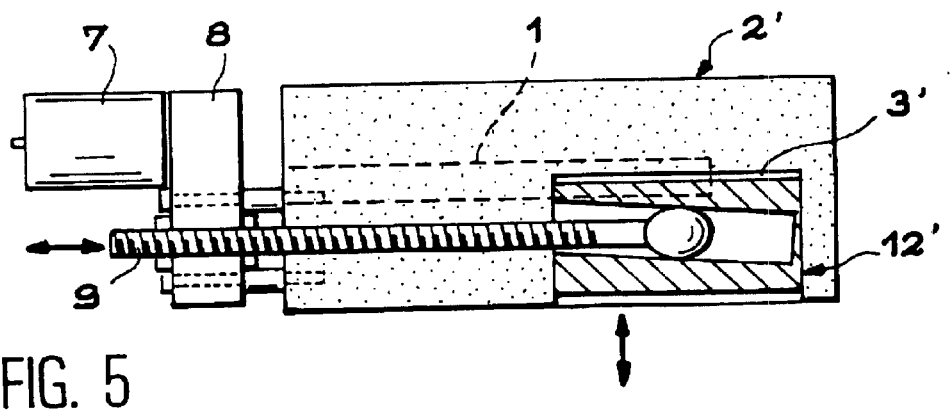

FIGS. 4 and 5 illustrate another embodiment of the invention, in which approximately the same parts are found, but in which the collimation slit, in this case denoted 3', is not placed on the face of the absorbent enclosure 2' which is opposite the motor 7, but rather on a lateral face; the counter 1 is still housed in a recess in the absorbent enclosure 2' that opens on the side of the motor 7, but it receives radiation laterally from the source 4, the axis 13 extends parallel to the counter 1 and to rod 9, and the drilling 11 is approximately parallel to the axis 13 and the collimation slit 3'. FIG. 5 shows that a sliding movement of the rod 9 moves the mobile part 12' vertically on this figure, always to open or close the collimation slit 3'.

Obviously, other embodiments derived from these designs or equivalent means could be designed without going outside the scope of the invention.

The convex face 15 may consist of an end facet 21 parallel to a facet of the fixed portion of the enclosure 2 that is separated from it by the collimation slit 3 when the slit 3 is more or less closed, and facet 22 forming an obtuse angle with the previous facet.

What is claimed is:

1. Radiation detector comprising a counter and an absorbent enclosure surrounding the counter except for a collimation slit leading to the counter, characterized in that it comprises:

a motor servocontrolled to a set counter signal current;

a transmission connecting the motor to a mobile portion of the absorbent enclosure, partially delimiting the collimation slit, to move the mobile portion to increase or reduce the width of the collimation slit depending on the activity of the motor, the motor moving on one side of the detector opposite the collimation slit and the transmission extending through the absorbent enclosure; and an axis parallel to a length direction of the collimation slit to which the mobile portion is articulated.

2. Radiation detector according to claim 1, characterized in that the transmission comprises a sliding rod finishing at a handle sliding in a drilling that is oblique with respect to the rod forming the mobile portion.

3. Radiation detector according to claim 1, characterized in that the mobile portion delimits the collimation slit by a convex face moving away from the axis.

* * * * *